US012186860B1

(12) United States Patent
George

(10) Patent No.: US 12,186,860 B1
(45) Date of Patent: Jan. 7, 2025

(54) TOOL TO EXPEDITE A THREADED FASTENING PROCESS

(71) Applicant: Gary F. George, Grosse Pointe Woods, MI (US)

(72) Inventor: Gary F. George, Grosse Pointe Woods, MI (US)

( * ) Notice: Subject to any disclaimer, the term of this patent is extended or adjusted under 35 U.S.C. 154(b) by 295 days.

(21) Appl. No.: 17/862,838

(22) Filed: Jul. 12, 2022

Related U.S. Application Data

(60) Provisional application No. 63/311,882, filed on Feb. 18, 2022.

(51) Int. Cl.
*B25B 13/48* (2006.01)

(52) U.S. Cl.
CPC .................................... *B25B 13/48* (2013.01)

(58) Field of Classification Search
CPC ......... B25B 13/00; B25B 13/44; B25B 13/48; B25B 13/481; B25B 13/50; B25B 13/5016; B25B 13/56; B25B 15/001; B25B 15/002; B25B 23/02; B25B 23/142; B25B 29/00; B23B 45/003
See application file for complete search history.

(56) References Cited

U.S. PATENT DOCUMENTS

| | | | | |
|---|---|---|---|---|
| 1,448,258 | A | 3/1923 | Coe | |
| 4,222,688 | A | 9/1980 | Le May | |
| D624,381 | S | 9/2010 | Waller | |
| 8,701,525 | B2 | 4/2014 | Grover et al. | |
| 8,955,414 | B2 | 2/2015 | Merrick | |
| 2007/0256526 | A1 * | 11/2007 | Razzaghi | B66F 3/12 81/176.15 |
| 2009/0314505 | A1 | 12/2009 | Jenkins | |
| 2011/0146460 | A1 * | 6/2011 | Grover | B25B 13/48 81/64 |
| 2011/0214537 | A1 * | 9/2011 | Redmond | B25B 13/28 81/91.3 |
| 2014/0265166 | A1 * | 9/2014 | Shaughnessy | B24B 45/006 279/143 |
| 2022/0118588 | A1 * | 4/2022 | Stewart | B25B 21/007 |

* cited by examiner

*Primary Examiner* — Robert J Scruggs
(74) *Attorney, Agent, or Firm* — Maiorana Patent Law, PA

(57) ABSTRACT

An apparatus comprising an attachment and a grip device. The attachment may be configured to connect the apparatus to a rotational tool. The grip device may comprise a first surface and a second surface. The attachment may be located at a center of the first surface. The attachment may enable the rotational tool to spin the grip device in a spin direction about an axis. The second surface may extend from the first surface to form an arc shape along the axis. The second surface may provide friction. The spin direction may enable the arc shape to rotate a fastener using the friction in a direction opposite to the spin direction.

20 Claims, 6 Drawing Sheets

TOOL TO EXPEDITE A THREADED FASTENING PROCESS

This application relates to U.S. Provisional Application No. 63/311,882, filed on Feb. 18, 2022, which is hereby incorporated by reference in its entirety.

FIELD OF THE INVENTION

The invention relates to rotational tools generally and, more particularly, to a method and/or apparatus for implementing a tool to expedite a threaded fastening process.

BACKGROUND

Conventionally, a fastener is added to a threaded rod (or bolt) by manually rotating (or threading) the fastener, either by hand or wrench, to an intended location. The manual process can be improved by using ratchets and power tools (i.e., drills) with socket type wrenches, but the tools are limited by the depth of the socket.

Other fastener aid systems that utilize a powered drill require the drill to be at a predetermined angle and distance away from the threaded rod. However, in order to function properly, the fastener aid must be parallel to the threaded rod. The precise and parallel restriction is difficult to maintain throughout the process and is prone to binding. Many times, the result is a damaged tool, fastener, or a cross-threading situation which could damage both the threaded rod and fastener. The user is also susceptible to injury from the tool binding if the proper angle is not maintained. When using a fastener aid system, upon the completion of rotating or threading a fastener, the user must then maintain the precise and parallel angle as the tool and drill are backed down or up the entirety of the threaded rod. If the precise and parallel angle is not maintained, the tool or the threads can be damaged. The entire procedure is time consuming, and often results in damage to the tool, the rod, or the user.

It would be desirable to implement a tool to expedite a threaded fastening process.

SUMMARY

The invention concerns an apparatus comprising an attachment and a grip device. The attachment may be configured to connect the apparatus to a rotational tool. The grip device may comprise a first surface and a second surface. The attachment may be located at a center of the first surface. The attachment may enable the rotational tool to spin the grip device in a spin direction about an axis. The second surface may extend from the first surface to form an arc shape along the axis. The second surface may provide friction. The spin direction may enable the arc shape to rotate a fastener using the friction in a direction opposite to the spin direction.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
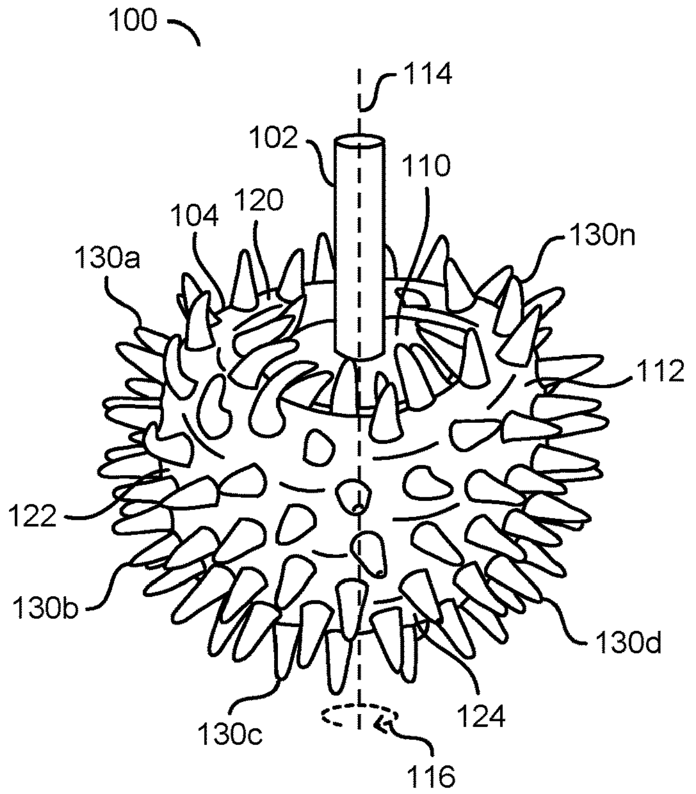
FIG. 1 is a diagram illustrating an example embodiment of the present invention.

Embodiments of the present invention include providing a tool to expedite a threaded fastening process that may (i) enable access to the fastener from any angle, (ii) attach to a rotational tool, (iii) implement an arc shape that uses friction to spin a fastener, (iv) implement appendages to aid in gripping a fastener, (v) spin about an axis, (vi) provide a quick connect for a drill bit, (vii) implement a compressible material to provide friction, (viii) comprise a toroidal shape, (ix) implement a surface comprising multiple materials that each provide a different amount of friction and/or (x) be easy to implement with standardized tool connectors.

Embodiments of the present invention may comprise an apparatus configured to expedite tightening or loosening of a fastener from a rod (or bolt or axle). A robust grip provided by the apparatus may enable the fastening process to be performed without damaging a rotational tool, the apparatus, the fastener or without causing injury to a user. The apparatus may comprise a grip device configured to use friction to rotate a fastener up or down a threaded rod.

Embodiments of the present invention may be configured to provide an attachment that may connect to a rotating device and/or a rotational tool (e.g., a powered drill). For example, standardized connectors (e.g., a hex shank) may be implemented to provide a secure connection with a chuck of a powered rotational tool. When the attachment to the rotational tool is secure, the grip device may be placed against the fastener. Pressing the grip device against the fastener with sufficient pressure may compress a resilient material of the grip device. Compressing the material of the grip device may provide an amount of friction that may grip to the fastener. As the rotational tool spins the grip device, the friction between the grip device and the fastener may cause the fastener to rotate up or down the threaded rod. The speed that the fastener spins may be related to a spin rate of the rotational tool, which may be controlled at a speed determined by the user and the rotational tool.

The user may keep the rotating device in contact with the fastener to enable the grip device to move the fastener to a desired location. The grip device may not be mechanically tethered to the fastener or the threaded rod. Since the friction may cause the fastener to spin using friction instead of a mechanical tether, the apparatus may eliminate a possibility of the device binding.

Embodiments of the present invention may enable the grip device to be lifted away from the fastener without damaging the rotational tool, the apparatus, the fastener, the user, or any nearby objects. For example, if there is an obstruction while moving the fastener, (e.g., an obstruction on the threaded rod or in close proximity to the threaded rod), the grip device may be pulled away from the fastener at any angle. Once the obstruction is addressed (e.g., moved out of the way or worked around), the grip device may easily resume the process of spinning the fastener without backing a tool off the entirety of the rod. For example, the user may simply press the grip device against the fastener again, start the rotational tool, and continue to follow the fastener to the intended position. The apparatus may enable the fastener to be moved at a much higher speed than if the fastener was moved manually.

Referring to FIG. 1, a diagram illustrating an example embodiment of the present invention is shown. An apparatus 100 is shown. The apparatus 100 may be configured to implement a tool to expedite a threaded fastening process.

The apparatus 100 may comprise an attachment 102 and a grip device 104. The attachment 102 may implement a shaft (or spindle). The attachment 102 may be configured to connect to a rotational tool (not shown). The grip device 104 may comprise a surface 110 and a surface 112. The surface 110 and the surface 112 may be outer (e.g., external) surfaces of the grip device 104.

The attachment 102 may be located at a center of the surface 110. An axis 114 is shown extending through a center of the attachment 102 and the grip device 104. The attachment 102 may enable the rotational tool to spin the grip device 104 in a spin direction 116 about the axis 114 (e.g., the axis of the attachment 102). In the example shown, the grip device 104 may be a generally spherical shape.

The apparatus 100 may implement the attachment 102 to attach to a powered rotational tool in order to improve a speed and/or safety of rotating a fastener on a threaded rod. The attachment 102 may be attached to the grip device 104. In one example, the attachment 102 may be permanently affixed to the grip device 104 (e.g., molded together, connected using a bonding agent, etc.). In another example, the attachment 102 may be removably attached to the grip device 104 (e.g., mechanically attached using a removable fastener such as a nut). The attachment 102 may be inserted through a center of the surface 110 to ensure that the grip device 104 has a stable rotation about the axis 114 of the attachment 102. In some embodiments, the surface 110 may be plane oriented perpendicular to the attachment 102 (e.g., perpendicular to the axis 114 that the grip device 104 spins about).

The surface 112 may extend from the surface 110 to form an arc shape along the axis 114 of the attachment 102. The surface 112 may comprise a narrow radius portion 120, a wide radius portion 122 and a narrow radius portion 124. The portions of varying radius 120-124 may provide the arc shape of the surface 112. The narrow radius portion 120 may be a portion of the surface 112 that connects to the surface 110. For example, the narrow radius portion 120 may have a similar radius as the surface 110. The surface 112 may extend from the narrow radius portion 120 to the wide radius portion 122. The wide radius portion 122 may generally be across a middle of the grip device 104. In an example, the wide radius portion 122 may be an equator of the grip device 104. The narrow radius portion 124 may be at an end of the grip device 104 opposite to the surface 110. In one example, the narrow radius portion 124 may have a similar radius as the narrow radius portion 120. In another example, the narrow radius portion 124 may form a pole at one end of the spherical shape of the grip device 104 (e.g., the narrow radius portion 124 may form an end of the grip device 104 opposite to the end of the grip device 104 that the attachment 102 extends out from). Generally, the arc shape of the surface 112 may comprise a radius that gradually increases from the narrow radius portion 120 and becomes larger until reaching a largest radius at the wide radius portion 122 and then gradually decreases until reaching the narrow radius portion 124.

In the example shown, the grip device 104 may be oriented with the attachment 102 sticking out of the surface 110 at a top end of the grip device 104 (e.g., along the axis 114). The narrow radius portion 120 may be at a top of the grip device 104 to connect to the surface 110. The narrow radius portion 124 may be at a bottom end of the grip device 104 (e.g., meeting at the axis 114). The wide radius portion 122 may be in between the narrow radius portion 120 and the narrow radius portion 124. The arc shape of the surface 112 may be along the axis 114 of the attachment 102.

The surface 112 may provide friction. The friction may provide a grip to a surface that touches the grip device 104 while the grip device 104 is spinning. The spin direction 116 caused by the rotation of the attachment 102 may enable the arc shape of the surface 112 to rotate a fastener using the friction of the surface 112. The friction created by the surface 112 against a fastener may cause the fastener to rotate in a direction opposite to the spin direction 116 of the grip device 104. The spin direction 116 shown may be a representative example. For example, the spin direction 116 may be in a clockwise direction or a counterclockwise direction depending on the powered rotational tool implemented and/or a desired spin direction selected by a user.

The surface 112 may be implemented with a material that may provide friction (e.g., a sufficient amount of friction to cause a fastener to rotate on a threaded rod). In one example, the material of the surface 112 may be a resilient material. The resilient material may be circumferentially affixed to the grip device 104 to form the surface 112. The resilient material of the surface 112 may facilitate an amount of friction to provide a grip that creates a force sufficient to rotate a fastener around a threaded rod while the grip device 104 spins about the axis 114 in the spin direction 116.

In the example shown, the surface 112 may comprise an irregular surface. Appendages 130*a*-130*n* are shown protruding from the surface 112. The appendages 130*a*-130*n* may provide the irregular surface. In the example shown, the appendages 130*a*-130*n* may comprise spikes that stick out in various directions from the grip device 104. A size, shape and/or material of the appendages 130*a*-130*n* may be selected for the surface 112 depending on a material of the fastener. The appendages 130*a*-130*n* may comprise resilient members that radiate from the surface 112 (e.g., extend outwards in a radiant manner). While the surface 112 may provide sufficient friction in order to rotate a fastener without implementing the appendages 130*a*-130*n*, the appendages 130*a*-130*n* may radiate from the surface 112 to provide sufficient grip in rotating the fastener around a threaded rod. The size, shape, arrangement, material, and/or density of the appendages 130*a*-130*n* may be varied according to the design criteria of a particular implementation.

Figure 2:
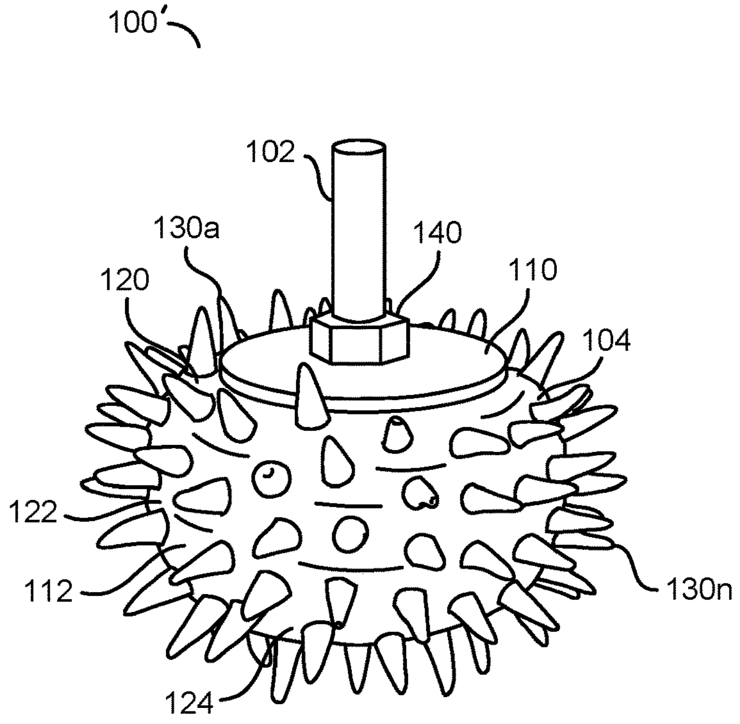
FIG. 2 is a diagram illustrating an alternate embodiment of the present invention.

Referring to FIG. 2, a diagram illustrating an alternate embodiment of the present invention is shown. The apparatus 1001 is shown. The apparatus 100' may comprise the attachment 102 and the grip device 104. In the example shown, the grip device 104 of the apparatus 100' may be implemented having a toroidal shape (e.g., a wide, flatter shape than the spherical shape of the apparatus 100 shown in association with FIG. 1). Generally, the toroidal shape may be centered about the axis 114 (not shown) extending through the attachment 102.

The grip device 104 of the apparatus 100' may comprise the surface 110 and the surface 112. The surface 110 may be implemented as a washer. A nut 140 is shown connected to the surface 110. The nut 140 may removably secure the attachment 102 to the grip device 104.

The surface 112 is shown comprising the appendages 130*a*-130*n*. The surface 112 may comprise the narrow radius portion 120, the wide radius portion 122 and the narrow radius portion 124. The portions 120-124 may provide the arc shape along the axis 114. The arc shape 120-124 for the apparatus 100' may have a wider and shorter arc length than the arc shape 120-124 of the apparatus 100 shown in association with FIG. 1.

The arc shape 120-124 may implement a toroidal shape (e.g., a spherical shape that is oblong creating a bulge around the equator). For example, a width of the wide radius portion 122 (e.g., around an equator of the grip device 104) may be proportionally larger than a length of the grip device (e.g., along the axis 114 of the attachment 102). An amount that the wide radius portion 122 has a larger width than the height of the grip device 104 may be varied according to the design criteria of a particular implementation.

Figure 3:
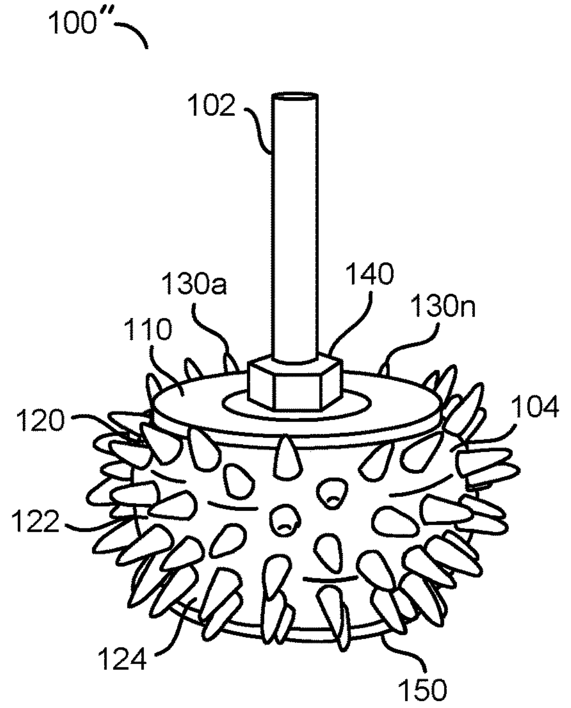
FIG. 3 is a diagram illustrating an example embodiment with a bottom surface.

Referring to FIG. 3, a diagram illustrating an example embodiment with a bottom surface is shown. The apparatus 100" is shown. The apparatus 100" may comprise the attachment 102 and the grip device 104. In the example shown, the grip device 104 of the apparatus 100" may be implemented having a toroidal shape (e.g., similar to the shape of the apparatus 100' shown in association with FIG. 2).

The grip device 104 of the apparatus 100" may comprise the surface 110 and the surface 112. The surface 110 may be implemented as the washer with the nut 140. The surface 112 may implement the arc shape 120-124 along the axis 114. The surface 112 may comprise the appendages 130*a*-130*n*.

The grip device 104 may comprise a surface 150. The surface 150 may be generally parallel to the surface 110. The axis 114 may be perpendicular to the surface 110 and the surface 150. In the example orientation of the apparatus 100" shown, the surface 110 may be at a top end of the grip device 104 and the surface 150 may be at a bottom end of the grip device 104. The surface 150 may provide a flat surface at an end of the grip device 104 opposite to an insertion location of the attachment 102. In one example, the surface 150 may be implemented as a washer. In some embodiments, the surface 150 may enable the grip device 104 to sit upright on a flat surface with the attachment 102 extending perpendicular to the flat surface that the surface 150 is sitting on. In some embodiments, the appendages 130*a*-130*n* may extend from the surface 150. Implementing a portion of the appendages 130*a*-130*n* on the surface 150 may enable the portion of the grip device 104 opposite to the insertion point of the attachment 102 to provide the friction.

The surface 112 may extend from the surface 110 to the surface 150. The narrow radius portion 120 may be connected to the flat surface 110. The narrow radius portion 124 may be connected to the flat surface 150. The wide radius portion 122 may be located in between the surface 110 and the surface 150. For example, the wide radius portion 122 may be an equator centered in between the surface 110 and the surface 150. The arc shape 120-124 may extend from the surface 110 to the surface 150. The wide radius portion 122 may have a larger radius than the surface 110 or the surface 150.

Figure 4:
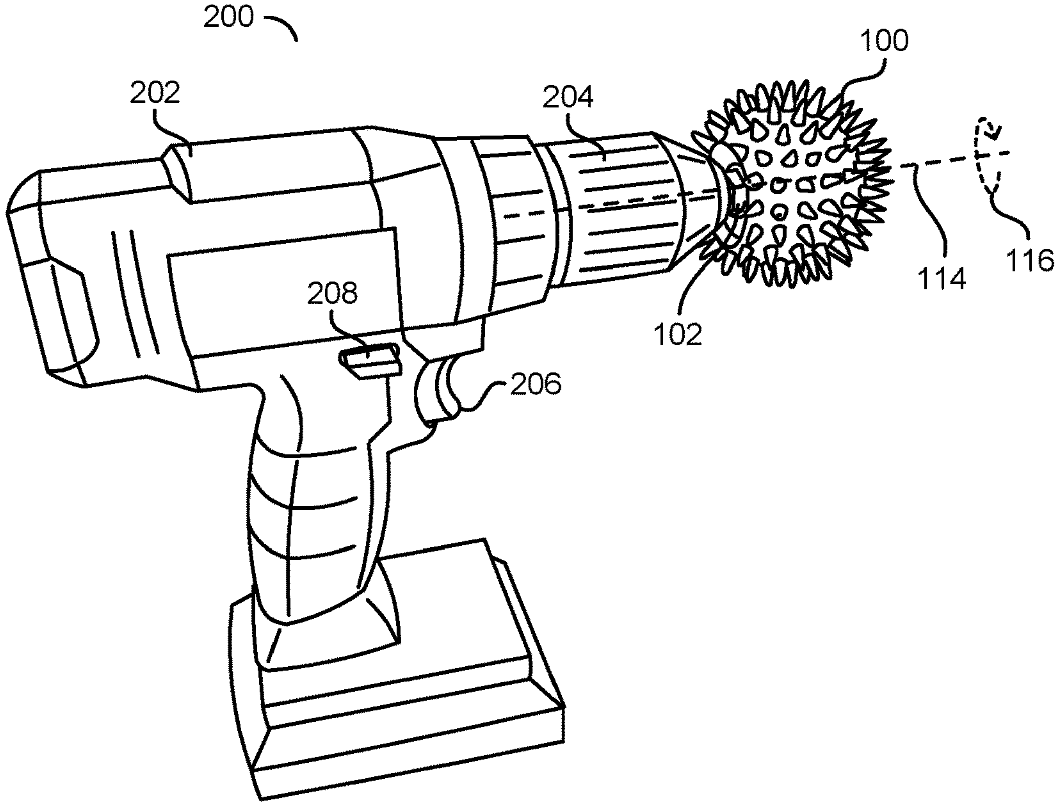
FIG. 4 is a diagram illustrating the apparatus connected to a rotational tool.

Referring to FIG. 4, a diagram illustrating the apparatus connected to a rotational tool is shown. An example rotational tool installation 200 is shown. The example rotational tool installation 200 may comprise the apparatus 100 and a rotational tool 202. The apparatus 100 may be installed in the rotational tool 202.

In the example shown, the rotational tool 202 may be a power drill. For example, the rotational tool 202 may be a hand-held, cordless, battery-powered drill. In another example, the rotational tool 202 may be a drill press. In yet another example, the rotational tool 202 may be a corded rotary tool. In still another example, the rotational tool 202 may be a handheld mixer. The type of rotational tool 202 that the apparatus 100 may connect to may be varied according to the design criteria of a particular implementation.

The rotational tool 202 may comprise a chuck 204, a button 206 and/or a selection button 208. The chuck 204 may be configured to receive and secure various attachment devices to the rotational tool 202. In an example, the chuck 204 may hold a drill bit. In another example, the chuck 204 may hold a cutting wheel. In yet another example, the chuck 204 may hold a sanding wheel. The attachment 102 is shown inserted into the chuck 204. For example, the grip device 104 may be connected to the chuck 204 using the attachment 102, similar to the insertion of a drill bit. The chuck 204 may provide a secure connection between the rotational tool 202 and the apparatus 100. For example, the attachment 102 may extend from the surface 110 and connect to the chuck 204 of the rotational tool 202.

The button 206 may be a trigger button. The trigger button 206 may cause the rotational tool 202 to spin/rotate at the chuck 204. In the example shown, pressing the trigger button 206 may enable power from the battery of the portable, cordless drill 202 to automatically rotate the chuck 204. The rotation of the chuck 204 may spin the attachment 102. Since the attachment 102 is connected to the grip device 104, the spinning of the attachment 102 may cause the grip device 104 to spin in the same direction (e.g., the spin direction 116). Pressing the button 206 may enable a powered rotation of the apparatus 100 about the axis 114.

The selection button 208 may be configured to control a direction of the spin of the chuck 204. Toggling the selection button 208 may enable the apparatus 100 to spin in different directions. In one example, when the selection button 208 is extended, the chuck 204 may rotate in a clockwise direction, causing the apparatus 100 to spin in a clockwise direction. In another example, when the selection button 208 is depressed, the chuck 204 may rotate in a counterclockwise direction, causing the apparatus 100 to spin in a clockwise direction. By changing the direction of the spin using the selection button 208, the apparatus 100 may be configured to rotate a fastener in one direction or another direction. For example, the apparatus 100 may be configured to tighten or loosen a fastener (e.g., move a fastener up or down a threaded rod) depending on the spin direction 116 of the grip device 104. The method of selecting the spin direction 116 using the rotational tool 202, the rotational speed (e.g., RPM) of the chuck 204 and/or the method of triggering the apparatus 100 to spin may be varied according to the design criteria of a particular implementation.

The axis 114 is shown through the apparatus 100. The attachment 102 may be inserted into the chuck 204. The axis 114 may extend through a center of the chuck 204. In the example shown, the spin direction 116 may be a clockwise direction. Pressing the selection button 208 may cause the spin direction 116 to switch to the counterclockwise direction.

Figure 5:
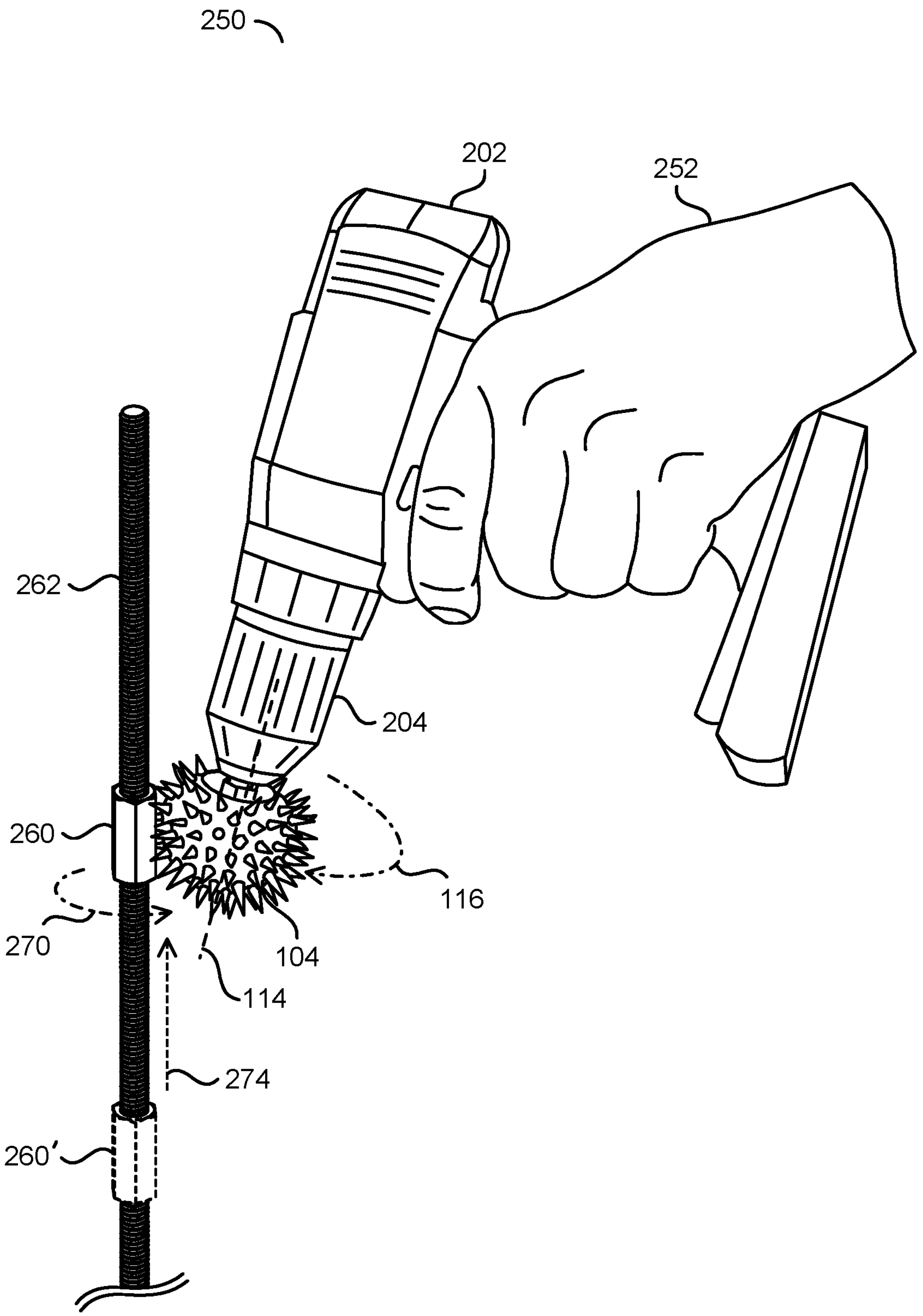
FIG. 5 is a diagram illustrating a spin direction of a surface of the apparatus rotating a fastener in an opposite direction using friction.

Referring to FIG. 5, a diagram illustrating a spin direction of a surface of the apparatus rotating a fastener in an opposite direction using friction is shown. A fastener loosening scenario 250 is shown. The fastener loosening scenario 250 may comprise the grip device 104 of the apparatus 100 attached to the chuck 204 of the rotational tool 202. The fastener loosening scenario 250 may comprise a user 252, a fastener 260 and a threaded rod 262.

The user 252 is shown operating the rotational tool 202. For example, the user 252 may be pressing the trigger button 206, causing the chuck 204 to spin about the axis 114 in the spin direction 116. In the example shown, the spin direction 116 may be clockwise from the perspective of the user 252. The attachment 102 inserted into the chuck 204 may enable the rotational tool 202 to spin the grip device 104 in the spin direction 116 about the axis 114. For example, the axis 114 may be along the length of the attachment 102 and through an opening of the chuck 204.

The fastener 260 is shown on the threaded rod 262. In an example, the fastener 260 may be a nut and the threaded rod 262 may be a bolt. In the example shown, the threaded rod 262 may be long (e.g., too long to attach a socket for a socket wrench). In an example, rotating the fastener 260 clockwise may cause the fastener 260 to move down the threaded rod 262 and rotating the fastener 260 counterclockwise may cause the fastener 260 to move up the threaded rod 262.

A dashed arrow 270 is shown around the fastener 260. The dashed arrow 270 may represent a spin direction of the fastener 260. In the example shown, the spin direction 270 may be counterclockwise from the perspective of the user 252.

The grip device 104 is shown pressed against the fastener 260. The appendages 130*a*-130*n* may create frictional contact with the fastener 260. Pressing the surface 112 against the fastener 260 may cause a resilient material of the grip device 104 to compress. A compression of the material of the surface 112 of the grip device 104 may create frictional contact with the fastener 260. The friction created by the grip device 104 against the fastener 260 may create a force between the grip device 104 and the fastener 260 to enable the grip device 104 to move the fastener 260.

The spin direction 116 of the grip device 104 may rub against the fastener 260 with the frictional force. The spin direction 116 of the grip device 104 may cause the fastener 260 to move (e.g., rotate). The spin direction 116 of the grip device 104 may rotate the fastener 260 in the spin direction 270. The spin direction 270 of the fastener 260 caused by the grip device 104 may be opposite to the spin direction 116 of the grip device 104. In the example shown, the clockwise spin direction 116 of the grip device 104 caused by the power of the rotational tool 202 may cause the fastener 260 to rotate with the counterclockwise spin direction 270.

An original location of the fastener 260' is shown on the threaded rod 262. The original location of the fastener 260' may be near a bottom of the threaded rod 262. A dashed arrow 274 is shown. The dashed arrow 274 may represent a movement direction of the fastener 260 along the threaded rod 262. The opposite spin direction 270 of the fastener 260 caused by the spin direction 116 of the grip device 104 may move the fastener 260 in the movement direction 274. In the example shown, the movement direction 274 may be a movement up the threaded rod 262. For example, the counterclockwise spin direction 270 of the fastener 260 generated by the spin direction 116 of the grip device 104 may loosen the fastener 260 on the threaded rod 262.

The user 252 may follow the movement of the fastener 260 up the threaded rod 262 to enable the grip device 104 to continually make contact with the fastener 260 to enable the spin direction 116 to cause the opposite spin direction 270. In the example shown, the user 252 may move the grip device 104 at the end of the rotational tool 202 in the movement direction 274 up the threaded rod 262 as the fastener 260 moves in the movement direction 274. The user 252 may hold the rotational tool 202 such that the axis 114 is at an angle with the threaded rod 262 to enable the surface 112 to make contact with the fastener 260. In the example shown, the angle of the axis 114 may be a small angle and the axis 114 may be close to parallel with the threaded rod 262. The user 252 may remove the grip device 104 from the fastener 260 at any time to stop moving the fastener 260 without causing damage to the grip device 104, the rotational tool 202, the user 252, the fastener 260 and/or the threaded rod 262.

Figure 6:
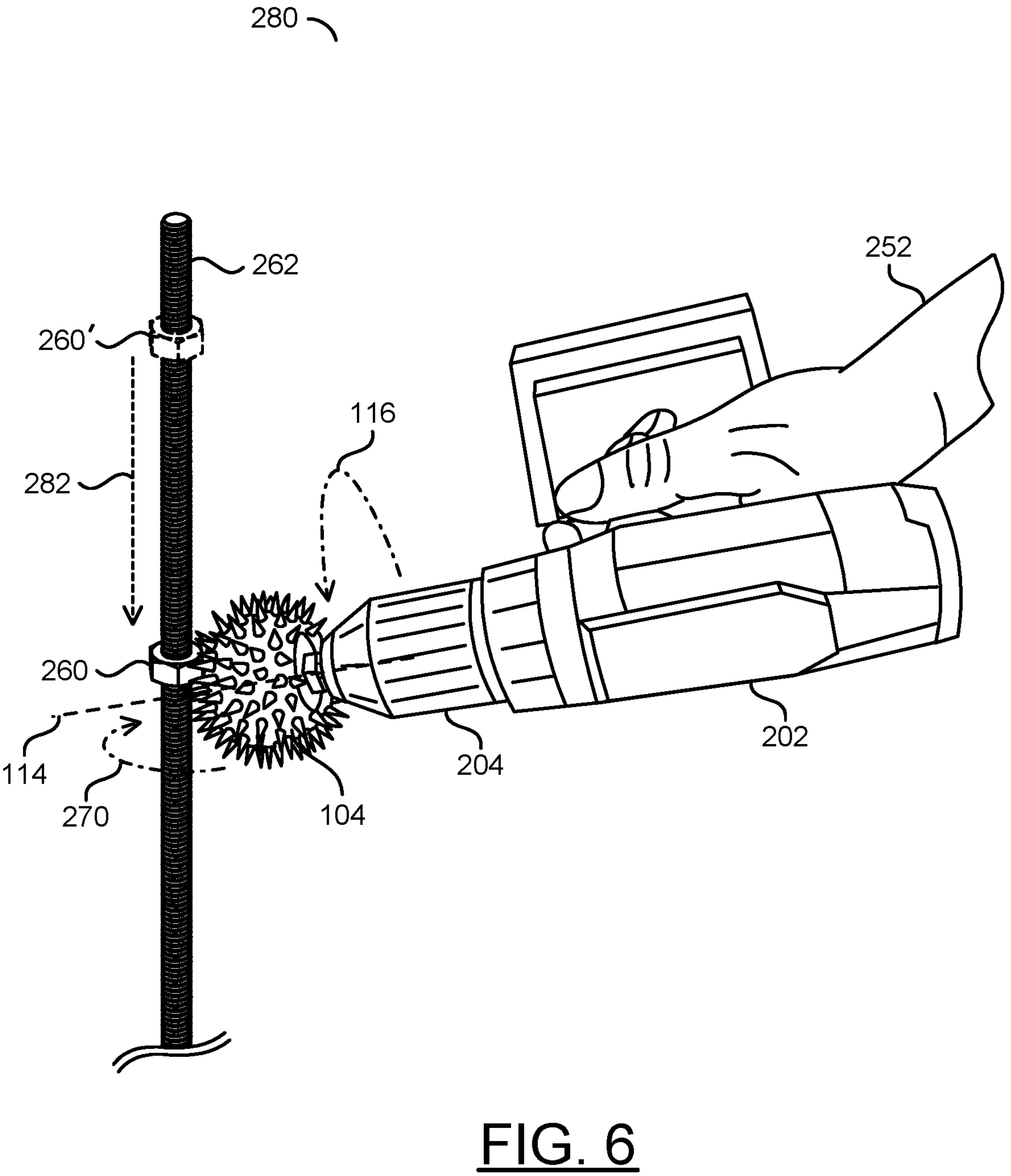
FIG. 6 is a diagram illustrating an arc shape of the surface accessing a fastener from an alternate angle.

Referring to FIG. 6, a diagram illustrating an arc shape of the surface accessing a fastener from an alternate angle is shown. A fastener tightening scenario 280 is shown. The fastener tightening scenario 280 may comprise the grip device 104 of the apparatus 100 attached to the chuck 204 of the rotational tool 202. The fastener tightening scenario 280 may comprise the user 252, the fastener 260 and the threaded rod 262.

In the fastener tightening scenario 280, the spin direction 116 of the grip device 104 may be a counterclockwise direction from the perspective of the user 252. In an example, the user 252 may press the selection button 208 of the rotational tool 202 to change the rotation direction of the chuck 204. Changing the rotation direction of the chuck 204 may rotate the attachment 102 in the opposite direction, which may change the spin direction 116 of the grip device 104.

The spin direction 116 of the grip device 104 may create the opposite direction spin 270 of the fastener 260 on the threaded rod 262. In the example shown, the counterclockwise spin direction 116 of the grip device 104 may create the clockwise opposite spin direction 270 of the fastener 260. By changing the spin direction 116 of the grip device 104, the result may be a change in the opposite spin direction 270 of the fastener 260.

In the fastener tightening scenario 280, the original location of the fastener 260' may be near a top of the threaded rod 262. A dashed arrow 282 is shown. The dashed arrow 282 may represent a movement direction of the fastener 260 along the threaded rod 262. The opposite spin direction 270 of the fastener 260 caused by the spin direction 116 of the grip device 104 may move the fastener 260 in the movement direction 282. In the example shown, the movement direction 282 may be a movement down the threaded rod 262. For example, the clockwise spin direction 270 of the fastener 260 generated by the counterclockwise spin direction 116 of the grip device 104 may tighten the fastener 260 on the threaded rod 262.

In the fastener loosening scenario 250 shown in association with FIG. 5, the surface 112 of the grip device 104 may be pressed against the fastener 260 at the wide radius portion 122. For example, the user 252 may hold the rotational tool 202 generally downwards (e.g., the axis 114 may be nearly parallel to the threaded rod 262) to cause the spin direction 116. In the fastener tightening scenario 280, the surface 112 of the grip device 104 may be pressed against the fastener 260 using the end of the grip device 104 opposite to the attachment 102. In an example, the surface 150 may be pressed against the fastener 260. The arc shape 120-124 of the grip device 104 may enable the surface 112 to access the fastener 260 from any angle while still providing enough friction with the spin direction 116 to cause the opposite spin direction 270 on the fastener 260.

In the example shown, the angle of the axis 114 may be a larger angle than shown in the association with FIG. 5 and the axis 114 may be close to perpendicular with the threaded rod 262. Similar to the fastener loosening scenario 250, in the fastener tightening scenario 280, the user 252 may move the grip device 104 at the end of the rotational tool 202 in the movement direction 282 down the threaded rod 262 as the fastener 260 moves in the movement direction 282.

The user 252 may hold the rotational tool 202 generally perpendicular to the threaded rod 262 and still create the opposite spin direction 270 on the fastener 260. By enabling the surface 112 to access the fastener 260 to create the opposite spin direction 270 from any angle, the user 252 may have multiple accessibility options for moving the fastener 260 (e.g., the angle of access may be selected based on the comfort of the user 252, the handedness of the user 252, to avoid obstacles, etc.). While a generally parallel access of the user 252 is shown in the fastener loosening scenario 250 and a generally perpendicular access of the user 252 is shown in the fastener tightening scenario 280, the angle of access using the rotational tool 202 may be varied according to the desire of the user 252.

Figure 7:
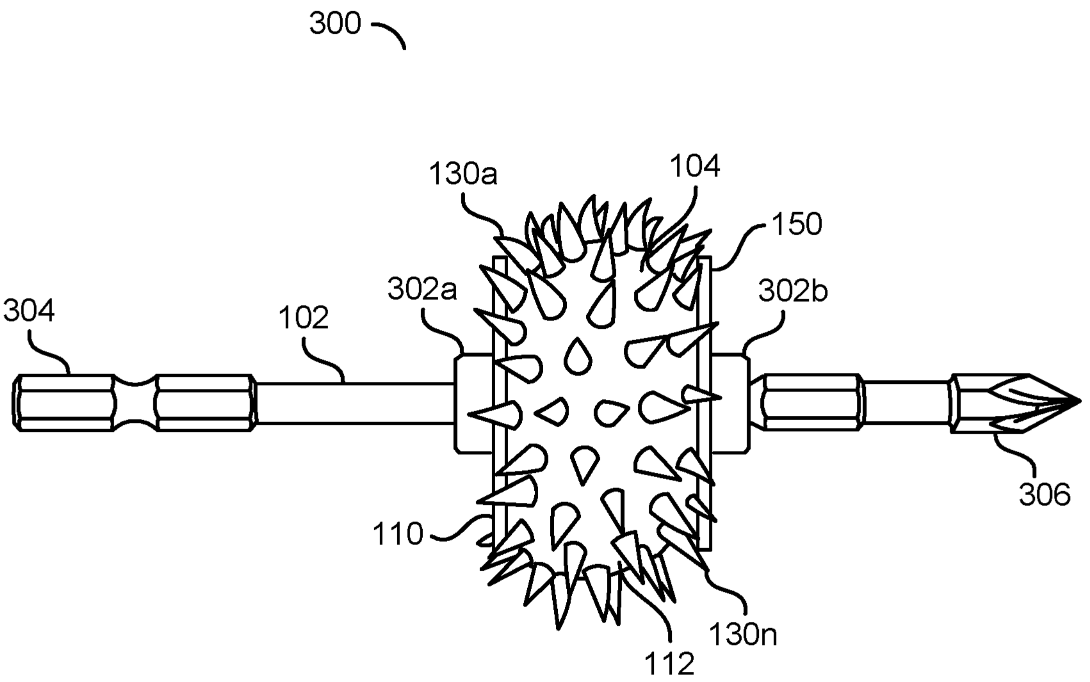
FIG. 7 is a diagram illustrating an example embodiment of the apparatus implementing a quick connect for a rotational tool.

Referring to FIG. 7, a diagram illustrating an example embodiment of the apparatus implementing a quick connect for a rotational tool is shown. A quick connect embodiment 300 is shown. The quick connect embodiment 300 may comprise the attachment 102 and the grip device 104. The surface 110, the surface 112 and the surface 150 are shown on the grip device 104. The appendages **130*a*-130*n* are shown extending from the surface 112. The grip device 104 is shown with a toroidal shape and the surface 110 and the surface 150** may each provide a flat surface.

A quick connect **302*a* and a quick connect 302*b* are shown. The quick connect 302*a* may be implemented on the surface 110. The quick connect 302*b* may be implemented on the surface 150. In the example shown, the quick connect 302*a* and the quick connect 302*b* may extend along the axis 114 (not shown) through the center of the surface 110 and the center of the surface 150, respectively. The quick connects 302*a*-302*b* may each implement an opening. The openings implemented by the quick connects 302*a*-302*b* may be configured to provide a secure connection to various shaft attachments. For example, pressing and/or twisting a shaft with the appropriate shape into one of the quick connects 302*a*-302*b* may cause the shaft to click in and secure to the quick connects 302*a*-302*b* for a secure hold. When a shaft is secured to one of the quick connects 302*a*-302*n*, pressing and/or twisting the shaft may release the shaft from the quick connects 302*a*-302*b*. Securing and/or releasing the shafts from the quick connects 302*a*-302*b* may be performed by hand (e.g., without using an additional tool). The implementation of the quick connects 302*a*-302*b*** may be varied according to the design criteria of a particular implementation.

The attachment 102 is shown inserted into the quick connect **302*a*. A hex shank 304 is shown at one end of the attachment 102. The hex shank 304 may provide a standardized shape for the attachment 102. The standardized shape of the hex shank 304 may enable the attachment 102 to be inserted into various types of rotational tools. The quick connect 302*a* may enable the attachment 102 to be easily and quickly connected to or disconnected from the grip device 104**.

A drill bit 306 is shown inserted into the quick connect **302*b*. The drill bit 306 may also implement a hex shank. The quick connect 302*b* may be implemented to receive a standardized shape of a bit, such as a hex shank. The quick connect 302*b* may enable the drill bit 306 to be easily and quickly connected to or disconnected from the grip device 104. In the example shown, the drill bit 306 is shown connected to the quick connect 302*b*. For example, the drill bit 306 may enable the user to connect the apparatus 100 to the rotational tool 202 to enable tightening or loosening of the fastener 260, and still use the apparatus 100 to screw or unscrew various fasteners (e.g., screws) without having to switch out bits on the rotational tool 202. The quick connects 302*a*-302*b* may enable the expedited fastener threading process using the grip device 104 and screwing/unscrewing in one device. While the drill bit 306 is shown as one example bit attached using the quick connect 302*b*, the type of bit attached using the quick connect 302*b* may be varied according to the desire of the user 252**.

Figure 8:
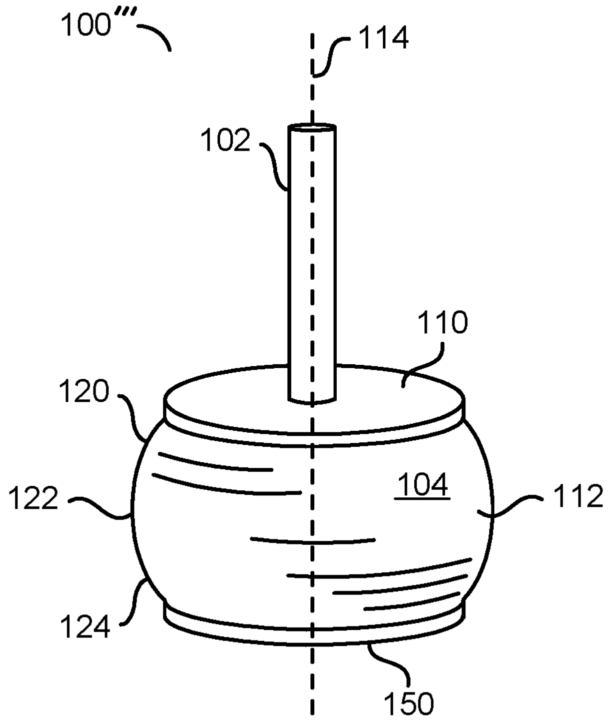
FIG. 8 is a diagram illustrating an example embodiment of the present invention implemented without appendages.

Referring to FIG. 8, a diagram illustrating an example embodiment of the present invention implemented without appendages is shown. The apparatus 100''' is shown. The apparatus 100''' is shown comprising the attachment 102 and the grip device 104. The surface 110, the surface 112 and the surface 150 of the grip device 104 are shown. The axis 114 is shown through the attachment 102, a center of the surface 110, a center of the grip device 104 and the center of the surface 150.

The surface 112 of the grip device 104 is shown without implementing the appendages **130*a*-130*n* as shown in association with FIG. 1. The grip device 104 is shown having the toroidal shape of the narrow radius portion 120, the wide radius portion 122 and the narrow radius portion 124. The grip device 104 is shown with the arc shape 120-124**.

The surface 112 may provide friction against the fastener 260, even without the appendages **130*a*-130*n*. For example, the arc shape 120-124 may be configured to provide the spin direction 116 using the friction caused by the surface 112. In an example, a compression of the surface 112 caused by pressing the surface 112 against the fastener 260 may provide the friction sufficient to create the opposite spin direction 270 in response to the spin direction 116. The material of the surface 112 may be a resilient material. The friction may be provided by a compression of the resilient material of surface 112**.

A durometer of the resilient material of the surface 112 may be selected depending on the size of, and material used in the threaded rod 262. The durometer of the resilient material of the surface 112 may also be selected depending on the size, material, and shape of the fastener 260. In some embodiments, the material may be a porous material. The type of material selected for the resilient material of the surface 112 may be varied according to the design criteria of a particular implementation.

Figure 9:
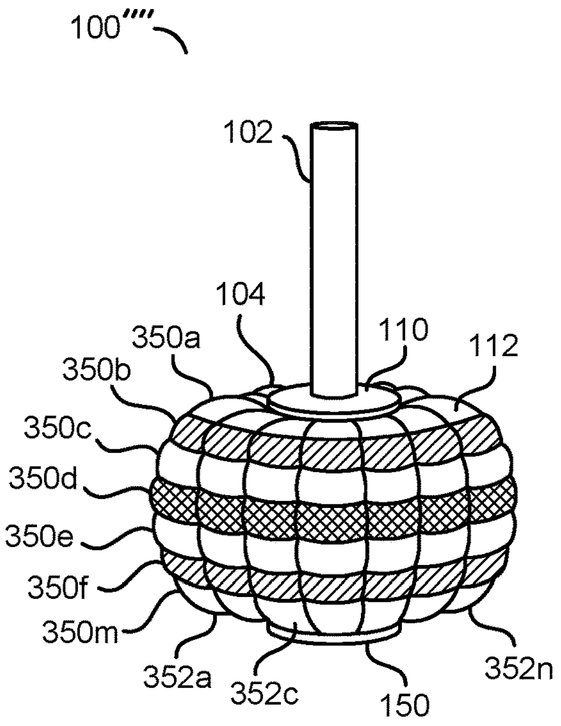
FIG. 9 is a diagram illustrating an example embodiment of the present invention comprising multiple sections that have different materials.

Referring to FIG. 9, a diagram illustrating an example embodiment of the present invention comprising multiple sections that have different materials is shown. The apparatus 100'''' is shown. The apparatus 100'''' is shown comprising the attachment 102 and the grip device 104. The surface 110, the surface 112 and the surface 150 of the grip device 104 are shown.

The grip device 104 is shown comprising a number of section rows **350*a*-350*m* and section columns 352*a*-352*n*. In the example shown, the number of section rows 350*a*-350*m* may be fewer than the number of section columns 352*a*-352*n*. The number, size and/or shape of the section rows 350*a*-350*m* and/or the section columns 352*a*-352*n*** may be varied according to the design criteria of a particular implementation.

One or more of the section rows 350*a*-350*m* and/or the section columns 352*a*-352*n* may be implemented with different material types. The different material types may each provide a different amount of friction. For example, each of the material types used may compress at different rates and/or compress a different amount with the same amount of force. In one example, one of the section rows 350*a*-350*m* (or section columns 352*a*-352*n*) may implement a rubber material. In another example, one of the section rows 350*a*-350*m* (or section columns 352*a*-352*n*) may implement a plastic material. In yet another example, one of the section rows 350*a*-350*m* (or section columns 352*a*-352*n*) may implement a material with a durometer hardness of 50A. In still another example, one of the section rows 350*a*-350*m* (or section columns 352*a*-352*n*) may implement a hard foam, kevlar, and/or any other type of compressible material. The compressible material implemented may be compressible enough to create friction against the fastener 260, but not compressible enough to cause a rotation of the grip device 104 to be unstable. The number, type and/or amount of compression of each of the material types implemented may be varied according to the design criteria of a particular implementation.

In the example shown, the section row 350*a*, the section row 350*c*, the section row 350*e* and the section row 350*m* may each implement a same material type. In the example shown, the section row 350*b* and the section row 350*f* may implement a same material type that is different from the material type of the section row 350*a*. In the example shown, the section row 350*d* may implement a material type that is different from the material type of the section row 350*a* and different form the material type of the section row 350*b*. In the example shown, the material type of the section columns 352*a*-352*n* may be the same material type depending on which of the section rows 350*a*-350*m* that the section columns 352*a*-352*n* correspond to. In an example, the material type used for the section row 350*a* may provide a different amount of friction and/or compression than the material type used for the section row 350*b*. Similarly, the material type used for the section row 350*d* may provide a different amount of friction and/or compression than the material type used for the section row 350*a* or the section row 350*b*. The arrangement of the material types in the section rows 350*a*-350*m* and/or the section columns 352*a*-352*n* may be varied according to the design criteria of a particular implementation.

Implementing sections of the surface 112 with different material types may offer a variety of friction at different locations of the grip device 104. In an example, more friction may be provided using the material type near the narrow radius portion 120, while less friction may be provided using the material type near the wide radius portion 122. The user 252 may select a section of the surface 112 for the thread fastening process that has a suitable amount of friction for the particular situation.

Figure 10:
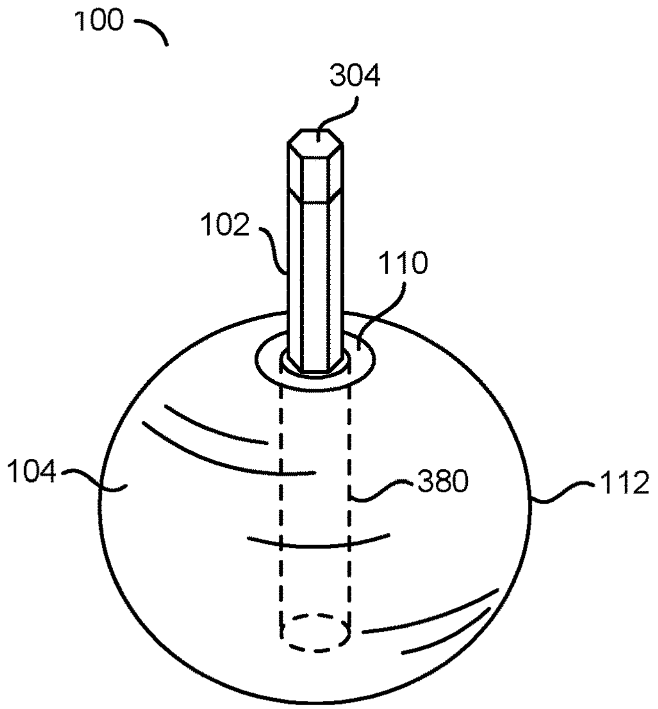
FIG. 10 is a diagram illustrating an attachment connected to the grip device.

Referring to FIG. 10, a diagram illustrating an attachment connected to the grip device is shown. A view of the top of the apparatus 100 is shown. The attachment 102 is shown connected to the grip device 104. The surface 110 and the surface 112 of the grip device are shown. For illustrative purposes, the appendages 130*a*-130*n* are not shown on the apparatus 100. The apparatus 100 may be implemented with or without the appendages 130*a*-130*n*.

The attachment 102 is shown comprising the hex shank 304. The hex shank 304 may enable the attachment 102 to securely connect to the rotational tool 202. In some embodiments, the attachment 102 may comprise the hex shank 304 connected to and extending from the surface 110.

A core 380 is shown within the grip device 104. In some embodiments, the core 380 may comprise a portion of the attachment 102. For example, the attachment 102 may be inserted into an opening on the surface 110 to form the apparatus 100 comprising the attachment 102 and the grip device 104 as a single device. In an example, the material of the grip device 104 may be built up around the core 380.

The core 380 may enable high volume automation and/or commercial production of the apparatus 100. In one example, the material of the grip device 104 may be heated and the attachment 102 may be pushed into the grip device 104. A portion of the attachment 102 that is within the grip device 104 may be the core 380. After the grip device 104 cools off, the attachment 102 may be securely attached to the grip device 104, with the hex shank 304 exposed and extending from the surface 110. In some embodiments, the attachment 102 may be secured within the grip device 104 using a bonding agent. For example, the attachment 102 may be inserted into the grip device 104 and the bonding agent may be added to form the core 380. Once the bonding agent dries, the attachment 102 may be securely attached to the grip device 104, with the hex shank exposed and extending from the surface 110. In one example, the bonding agent may be a quick drying glue. In another example, the bonding agent may be an epoxy. In yet another example, the bonding agent may be an acrylic-based adhesive. The type of bonding agent used may be varied according to the design criteria of a particular implementation.

In some embodiments, the core 380 may be an opening. For example, the attachment 102 may comprise the opening 380 configured to receive the hex shank 304. The attachment 102 may be inserted into the opening of the core 380 to form a secure connection. In an example, an interior of the core 380 may be threaded to enable a secure connection with threading implemented on the attachment 102. In another example, an interior of the core 380 may implement a collet with grab rings. In yet another example, an interior of the core 380 may implement a spring-loaded ball latching mechanism. The type of connection between the interior of the core 380 and the attachment 102 may be varied according to the design criteria of a particular implementation.

In the example shown, the core 380 may extend through an entire length of the grip device 104 (e.g., along the axis 114). For example, the core 380 may implement a through hole. In some embodiments, the core 380 may extend from the surface 110 and partially through the center of the grip device 104. For example, the core 380 may implement a blind hole. The core 380 may be centrally located with respect to the surface 110. The core 380 may extend through a middle of the grip device 104 to ensure that the rotation of the grip device 104 is stable. The implementation of the core 380 within the grip device 104 may be varied according to the design criteria of a particular implementation.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:

an attachment configured to connect said apparatus to a rotational tool; and a grip device comprising a first surface and a second surface, wherein (i) said attachment is located at a center of said first surface, (ii) said attachment enables said rotational tool to spin said grip device in a spin direction about an axis, (iii) said second surface extends from said first surface to form an arc shape along said axis, said arc shape having (a) a first narrow radius to connect to said first surface, (b) a second narrow radius and (c) a wide radius in between said first narrow radius and said second narrow radius, (iv) said second surface provides friction, and (v) said spin direction enables said arc shape to rotate a fastener using said friction in a direction opposite to said spin direction.

2. The apparatus according to claim 1, wherein rotating said fastener in said direction opposite to said spin direction enables said apparatus to expedite a thread fastening process.

3. The apparatus according to claim 1, wherein (i) a first direction for said spin direction is configured to tighten said fastener along a threaded rod and (ii) a second direction for said spin direction is configured to loosen said fastener along said threaded rod.

4. The apparatus according to claim 1, wherein (i) said second surface comprises a porous material, (ii) said arc shape forms a toroid around said first surface and (iii) said friction is created by a compression of said porous material against said fastener.

5. The apparatus according to claim 1, wherein (i) said second surface comprises a plurality of appendages extending from said second surface and (ii) said friction is created by a contact between said appendages and said fastener.

6. The apparatus according to claim 1, wherein said arc shape extends from said first surface to form a spherical shape.

7. The apparatus according to claim 1, wherein (i) said attachment extends from said first surface and (ii) said attachment is configured to connect to a chuck of said rotational tool.

8. The apparatus according to claim 1, wherein said attachment comprises a hex shank.

9. The apparatus according to claim 1, wherein said attachment comprises an opening configured to receive a hex shank for said rotational tool.

10. The apparatus according to claim 1, further comprising a third surface, wherein (i) said third surface is parallel to said first surface and (ii) said arc shape of said second surface extends from said first surface to said third surface.

11. The apparatus according to claim 10, wherein a second plurality of appendages extend from said third surface.

12. The apparatus according to claim 10, further comprising a second attachment on said third surface, wherein (i) said attachment is configured to implement a first opening for a quick connect and (ii) said second attachment is configured to implement a second opening for said quick connect.

13. The apparatus according to claim 12, wherein a drill bit is attached to said second attachment.

14. The apparatus according to claim 1, wherein said friction is provided by a compression of a resilient material of said second surface.

15. The apparatus according to claim 1, wherein said arc shape enables said second surface to access said fastener from any angle.

16. The apparatus according to claim 1, wherein (i) said second surface comprises a plurality of sections, (ii) said plurality of sections comprise at least one of a first material type and a second material type and (iii) said first material type provides a different amount of friction than said second material type.

17. The apparatus according to claim 1, wherein said rotational tool comprises a powered drill.

18. The apparatus according to claim 1, wherein said rotational tool comprises a rotary tool.

19. The apparatus according to claim 1, wherein said attachment is secured to said grip device by (i) heating a material of said grip device and (ii) inserting said attachment into said grip device.

20. The apparatus according to claim 1, wherein said grip device comprises a core (i) extending through a center of said grip device and (ii) comprising threading to enable a secure connection to said attachment.

* * * * *